May 31, 1938.　　R. WEICHARDT ET AL　　2,118,909
APPARATUS FOR MANIPULATING AIRCRAFT LANDING SAILS
Filed Aug. 23, 1935　　5 Sheets-Sheet 2
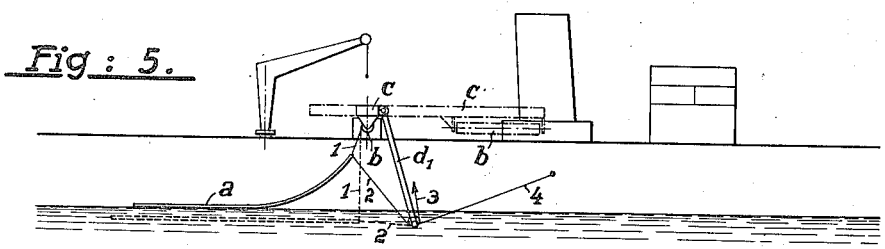
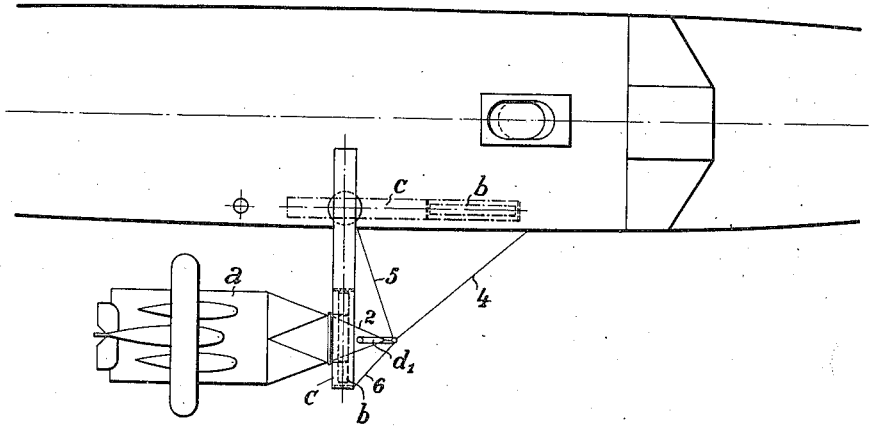
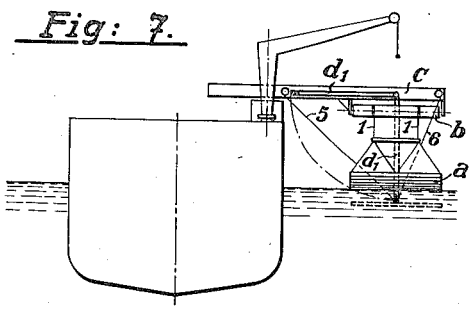
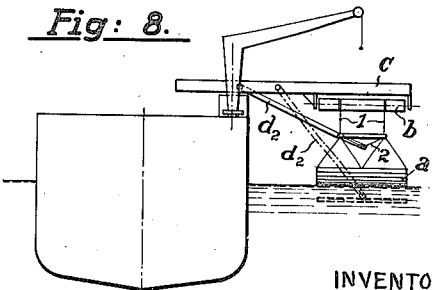
INVENTORS
RUDOLF WEICHARDT
WILLY IREISTADT
JOHANNES HICKE
By Emil Bönnelycke
ATTORNEY May 31, 1938.  R. WEICHARDT ET AL  2,118,909
APPARATUS FOR MANIPULATING AIRCRAFT LANDING SAILS
Filed Aug. 23, 1935  5 Sheets-Sheet 3
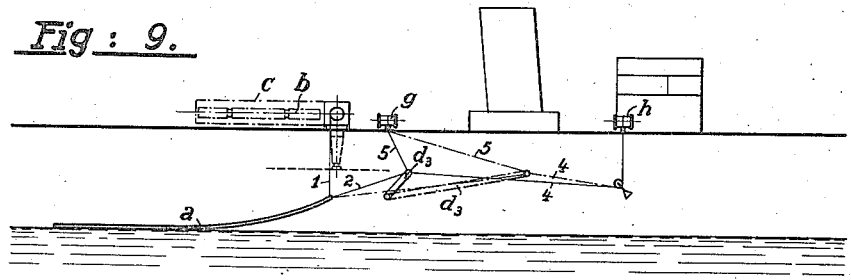
Fig: 9.
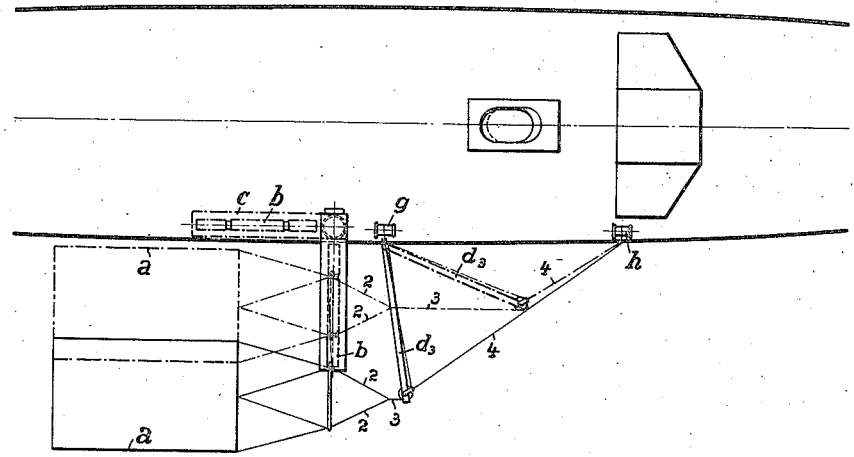
Fig: 10.
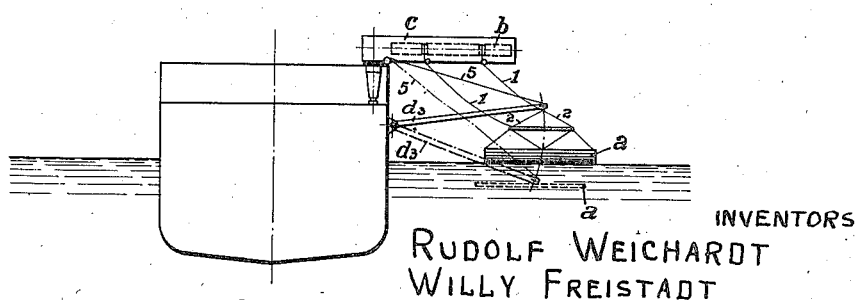
Fig: 11.
INVENTORS
RUDOLF WEICHARDT
WILLY FREISTADT
JOHANNES HICKE
By Emil Bönnelycke
ATTORNEY

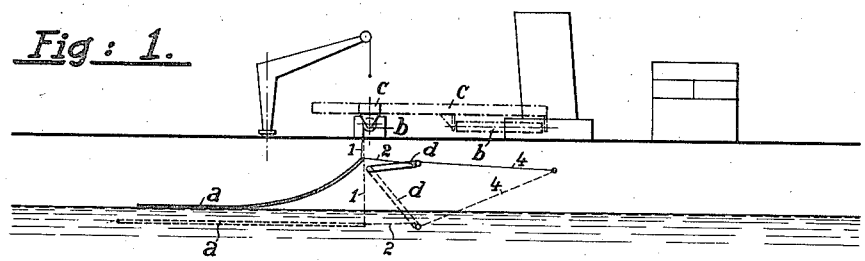
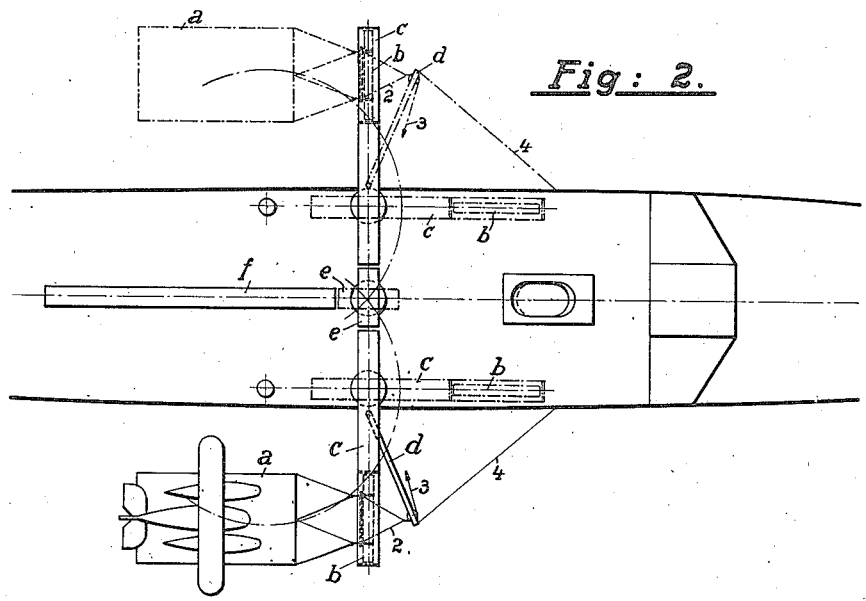
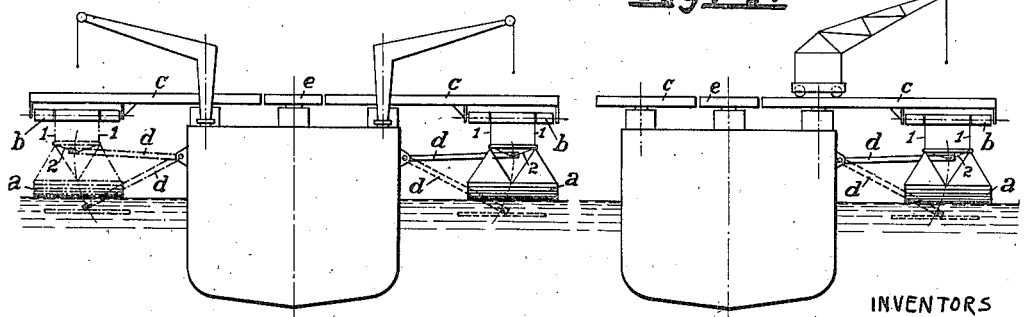

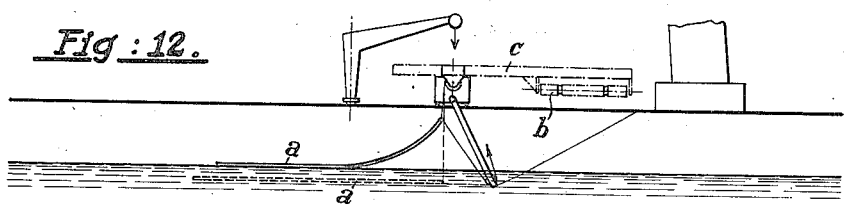
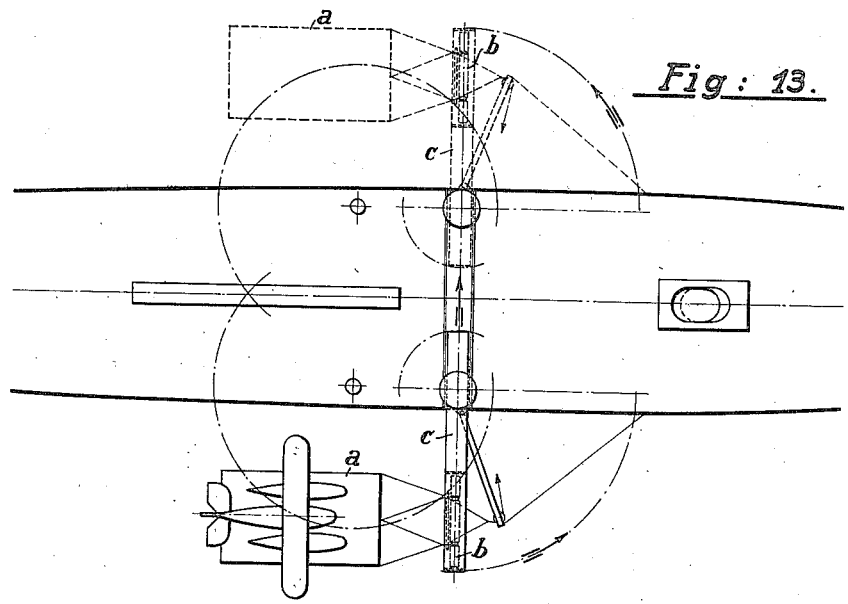
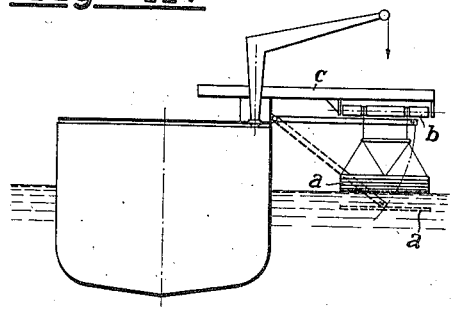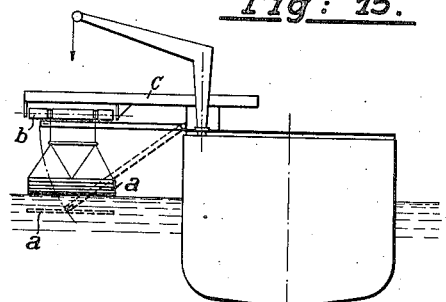

May 31, 1938.  R. WEICHARDT ET AL  2,118,909
APPARATUS FOR MANIPULATING AIRCRAFT LANDING SAILS
Filed Aug. 23, 1935   5 Sheets-Sheet 5
Fig: 16.
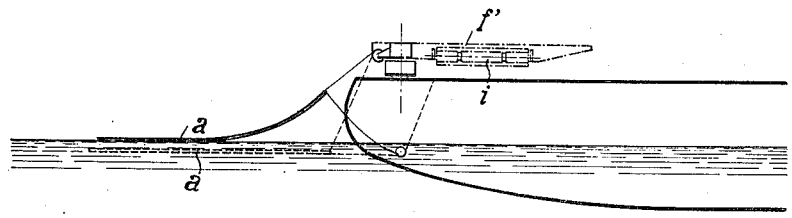
Fig: 17.
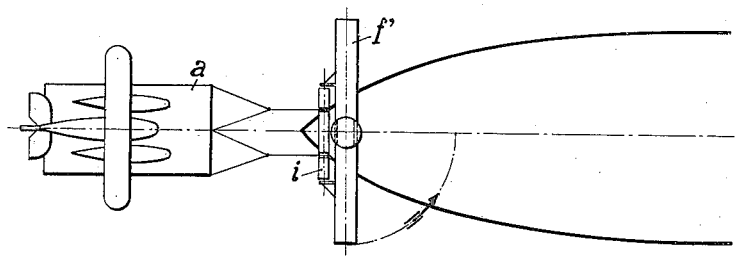
Fig: 18.
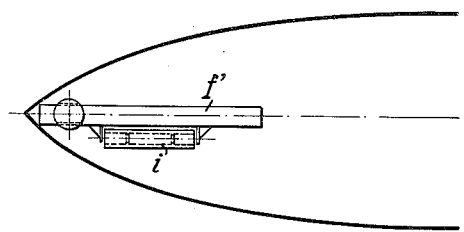
INVENTORS
RUDOLF WEICHARDT
WILLY FREISTADT
JOHANNES HICKE.
By Emil Bönnelycke
ATTORNEY Patented May 31, 1938

2,118,909

UNITED STATES PATENT OFFICE 2,118,909

APPARATUS FOR MANIPULATING AIRCRAFT LANDING SAILS

Rudolf Weichardt and Willy Freistadt, Bremen, and Johannes Hicke, Altona-Rissen, Germany, assignors to Krafft & Weichardt, Bremen, Germany, a corporation of Germany Application August 23, 1935, Serial No. 37,560
In Germany August 27, 1934

5 Claims. (Cl. 114—43.5)

Aircraft landing sails are arranged at the stern or side of a ship for landing aircraft and taking them on board. During use they are towed on the surface of the water; when astern they are held by towing lines from the ship's hull or a wide winding drum, when at the side by laterally mounted fixed or movable spars. When out of use they are either clewed up or rolled up on the winding drum or a rotatable spar.

As in the case of a landing sail at the side an aircraft must run on to the sail with its wing tips a sufficient distance from the side of the ship, the lateral spars are of considerable dimensions so that their mounting is difficult and usually involves a separate relatively high mast. In many cases, particularly during the taking on board of the aircraft, this may be a very great hindrance. For this reason, according to the invention, the spars are replaced by a low, crane-like carrier from which the device for rolling up the sail (winding drum) is suspended. The above mentioned mast and its tackle are thereby got rid of. At the same time more desirable conditions are obtained for the incorporation of driving mechanism, from the point of view of rigidity. The carrier can be swung out mechanically, and the motor for rotating the winding drum can be built into it. It can further also be used as a crane track.

As the landing sail is usually towed in the immediate neighbourhood of the aircraft projecting device on board, the crane-like carrier can at the same time be constructed as an aircraft accelerating track for launching on one or both sides, whereby very considerable simplification and saving of weight of the complete installation is achieved.

If an aircraft is to be taken on board and then launched, if possible landing on the sail will be effected on the lee side of the ship, while launching takes place to windward. According to the invention, in a particular embodiment two carriers or accelerating tracks, each with a towed sail, are provided one on each side of the ship, of which that sail which for the time being is on the lee side is brought into use. With this arrangement the ship can keep to any desired course without taking account of direction of the wind. The two aircraft projecting devices can be connected by a turntable with which a setting down track can connect.

In a further embodiment of the invention instead of the above mentioned arrangement of a carrier and auxiliary apparatus on each side of the ship, the carrier with or without its supporting base is arranged to be movable transversely of the ship. This renders the whole installation much simpler.

The flooding of the side sail is effected in known manner by the aid of a separate spar which can be movably attached in suitable manner to the side of the ship. This flooding spar can, however, according to the invention, be attached to the carrier or accelerating track itself. In this case its pivot about which it is downwardly swung in known manner during flooding can be located in towards the ship's side. In order to keep the distance of the outer end of the spar from the ship's side as far as possible constant in its various positions, the attachment of the spar to the carrier can be slidably arranged. The spar can, however, be attached outboard on the carrier in the mid-plane of the sail and then when swung to out of use has its outer end turned towards the ship. For use it is swung into the mid-plane of the sail, inclined forwardly and downwardly.

A further embodiment of the invention as regards the arrangement of the spar serves to give the latter various positions in order to enable the sail to be brought into the towing position, the winding up position and the flooding position by means of the spar.

The complete operating mechanism can be built into the carriers or accelerating tracks, or into the base supports thereof. A motor can be provided which in addition to the winding drums, drives the mechanical swing out devices (for example, quadrant, toggle, worm gear or the like) and if necessary the drums for winding up and operating the lines for the flooding spar, and another drum for operating the stays for swinging out and supporting the flooding spar attached to the carrier. The drums for the various lines can advantageously be coupled together so that the whole manoeuvring of the sail needs a minimum of control.

Some examples embodying the invention are illustrated in the accompanying drawings. Figures 1, 2 and 3 are respectively a side view, plan and transverse section of a first embodiment, and Figure 4 is a transverse section of an alternative to Figure 3. Figures 5, 6 and 7 are respectively a side view, plan and transverse section of a second embodiment, and Figure 8 is a transverse section of an alternative to Figure 7. Figures 9, 10 and 11 are respectively a side view, plan and transverse section of a third embodiment. Figures 12 and 13 are respectively a side view and plan and Figures 14 and 15 transverse sections of a fourth embodiment. Figures 16, 17 and 18 are respectively a side view and two plan views of a fifth embodiment.

In all the figures $a$ is the unrolled sail, $b$ the winding drum for the sail, which is supported by the carrier or accelerating track $c$. $l$ are the ropes by which the sail is secured to the winding drum; 2 is a bridle attached to the pointed ends of the sail, which leads to a towing line 3 which takes the whole tension of the sail during flooding; $d$ is the flooding spar which holds the towing line 3; 4 is a guy for the spar. In Figures 1–4, during operation the spar hangs outwardly freely under its own weight from the lines 2, 3 and 4 which are tensioned by the resistance of the sail. If an aircraft is to be received, the sail is unrolled from the drum $b$ and the towing line 3 unrolled with it, drawn in and fastened. Adjustment of the sail $a$ into any desired position is then effected by paying out or winding in the rope $l$. Figures 2 and 3 show the arrangement of carriers on both sides, advantageously both in the same or nearly the same transverse plane.

Figure 4 shows the use of the carriers or accelerating tracks as a track for the crane for taking the aircraft on board.

In the examples of Figures 1–4 the spar $d$ is attached in usual manner to the ship's side. Figures 4–8 show another arrangement.

According to Figures 5–7 the spar $d_1$ is attached outboard to the carrier or accelerating track $c$ itself in the mid-plane of the sail. By the aid of ties 5 and 6 it can be swung downwards into its operative position, and is there held by the ties and the guy 4. A separate drum can be provided for the ties 5 and 6 driven by the motor of the carrier $c$. The same provision is made for the towing line 3. If the sail is to be used, it is unrolled from the drum $b$ and at the same time towed by the line 3 rolled with it. Any desired adjustment of the position of the sail can then be effected by paying out the rope $l$ and correspondingly winding up the line 3 or vice versa.

According to Figure 8 the spar $d_2$ is borne upon the carrier or accelerating track in towards the ship's side. Its mode of operation corresponds with that of the spar $d$ shown in Figures 1–4. To keep its outer end at the same distance from the ship's side during its various operative positions, the attachment of the spar to the carrier can be slidably arranged. Sliding can be effected by means of a rope, worm gear, or the like.

In the above described embodiments the spar $d$, $d_1$, $d_2$ is mainly a flooding spar, that is it is movable mainly up and down in order to hold the points of the sail above water during towing and to submerge them for flooding. In view of the very circumscribed space conditions on the deck of a ship it is desirable to make the carrier $c$ as short as possible, that is to make it only so long that the drum $b$ connected with it comes so close to the side of the ship as just to enable the sail $a$ to be rolled up. This short carrier has the further advantage that owing to its smaller loading it is lighter in weight and is easier to manipulate. In this case the sail when unrolled from the drum supported close to the ship's side by the carrier $c$ must be moved away from the ship by the necessary distance for receiving an aircraft and must later be moved back when it is to be rolled up. Further the points of the sail must be brought into the towing and flooding positions by suitable devices, since the ropes $l$ owing to their inclined position with the sail moved away from the ship's side can no longer be used for this purpose. The spar is provided with devices for this purpose, which give its outer end the necessary positions as regards distance from the ship's side and height, for the towing, flooding and rolling up of the sail.

Such an embodiment is shown in Figures 9, 10 and 11. Here $d_3$ is the supporting spar which is both movable up and down and swingable laterally, as Figures 10 and 11 show. $g$ is a winding drum for regulating the height of the outer end of the spar $d_3$ by means of the line 5, $h$ is a winding drum for regulating the distance of the sail from the side of the ship by means of the line 15 guy 4, $l$ are the rolling up ropes, 2 the bridle for the sail points, 3 the towing line. Figures 9 and 10 show the arrangement with the supporting spar $d_3$ in towing and rolling up position. The latter position is indicated in chain lines while the towing position is shown in full lines. Figure 11 shows in full lines the towing position and in chain lines the flooding position of the spar and the towing and holding members connected thereto.

Figures 12–18 show embodiments with transversely movable carriers.

The carrier $c$ is slidable from starboard to port and vice-versa, so that the sail $a$ can be operated on either side at will with the same apparatus. This is illustrated in Figures 13–15. Similarly the aircraft can be launched either to starboard or port by the accelerating device arranged on the carrier, or it can be set upon the carrier or a setting down track by means of a crane. The omission of a second carrier and its auxiliary apparatus saves weight and space.

Sliding of the carrier as a whole with sail drum and base has been assumed for the example of Figures 12–15.

A similar apparatus can also be used for operating the sail at the stern. Such an arrangement is shown in Figures 16–18, in which a swingable and slidable carrier $f'$ at the stern of the ship carries a sail drum $i$ on its side and can at the same time serve as an aircraft accelerating device and also as the track for a crane. Figures 16 and 17 show the sail drum and the sail in position for use. Figure 18 shows the carrier swung in and slid forward. In spite of the pointed stern it is possible to unroll the sail and draw it in again. In this instance the carrier is slidable on its base.

Sliding of the carrier of the sail drum with its base or sliding thereof in or on its base simultaneously may be necessary if for example the deck structures or other impediments do not permit separate sliding.

What we claim is:—

1. Apparatus for manipulating aircraft on ships comprising a landing sail, a supporting means on the deck of the ship in the form of a vertical pivot, a low crane-like carrier rotatably mounted and solely supported on said pivot and horizontally arranged on the deck of the ship so that it may be horizontally swung on its pivot from the deck of the ship over and at right angles to the side of the ship, a drum rotatably secured to the carrier and attached to the sail so that the sail may be rolled thereon, and a spar pivotally mounted at one end to a rigid support and the other end having means connecting it with the landing sail to hold the sail for towing and to submerge the sail for flooding.

2. Apparatus according to claim 1, in which the top of the carrier constitutes a track upon which aircraft may be accelerated for launching purposes.

3. Apparatus according to claim 1, in which the top of the carrier constitutes a track, and a crane is provided on the track which is adapted to lift off and set down aircraft on the sail.

4. Apparatus according to claim 1 in which a winding drum is provided for operating the spar and in which a further drum is provided to move the spar horizontally to adjust the position of the sail away from and toward the side of the ship.

5. Apparatus according to claim 1, in which the carrier constitutes said rigid support.

RUDOLF WEICHARDT.
WILLY FREISTADT.
JOHANNES HICKE.